J. A. SHINE.
COTTON-PLANTER AND FERTILIZER DISTRIBUTER.

No. 187,056. Patented Feb. 6, 1877.

WITNESSES:
Gustave Dietrich
J. H. Scarborough

INVENTOR:
J. A. Shine
BY
ATTORNEYS.

UNITED STATES PATENT OFFICE.

JOSEPH A. SHINE, OF MOUNT OLIVE, NORTH CAROLINA.

IMPROVEMENT IN COTTON-PLANTER AND FERTILIZER-DISTRIBUTER.

Specification forming part of Letters Patent No. 187,056, dated February 6, 1877; application filed December 4, 1876.

*To all whom it may concern:*

Figure 1:
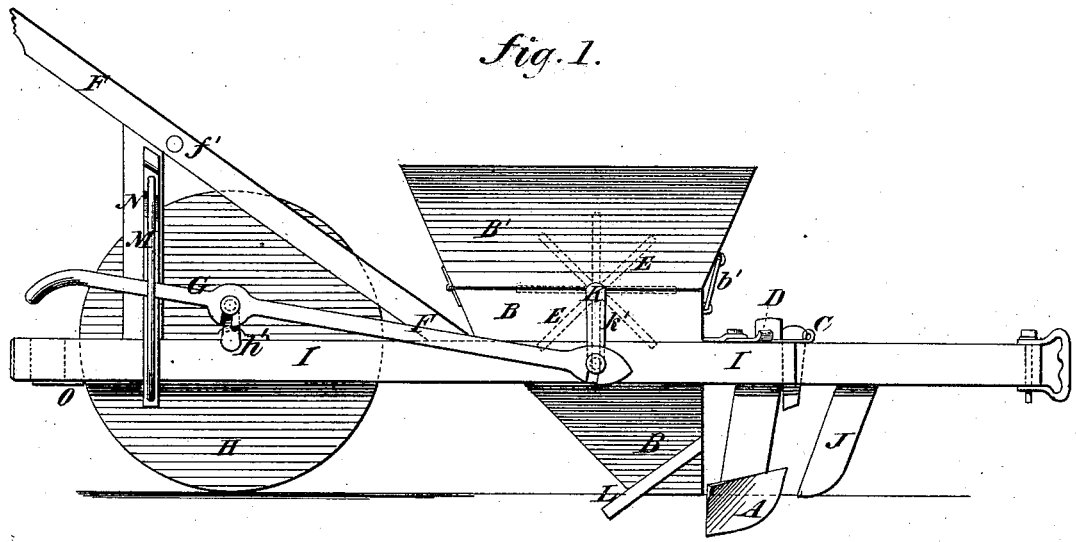
Figure 2:
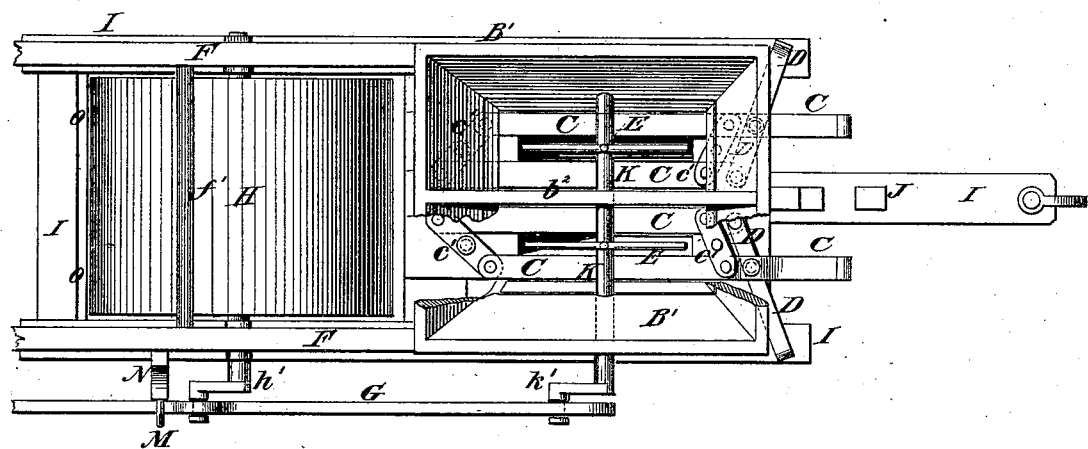

Be it known that I, JOSEPH ALEXANDER SHINE, of Mount Olive, in the county of Wayne and State of North Carolina, have invented a new and useful Improvement in Combined Cotton-Planter and Guano-Distributer, of which the following is a specification:

Figure 1 is a side view of my improved machine. Fig. 2 is a top view of the same, part of the hopper being broken away to show the construction.

Similar letters of reference indicate corresponding parts.

The object of this invention is to furnish an improved machine which shall be so constructed as to open a furrow, distribute cotton-seed and guano into it, and cover the seed, and which shall be simple in construction, strong, and durable.

The invention will first be described in connection with the drawing, and then pointed out in the claim.

I represents the frame of the machine, the central bar of which projects in front to serve as a draw-bar. To the draw-bar of the frame I is attached the upper end of the fender J, the forward side of the lower end of which is rounded off, as shown in Fig. 1. The fender J is designed to push off clods and lumps from before the opener A, and to prevent the said opener from being struck by stumps and other obstructions. The standard of the opener A passes up through a slot in the center bar of the frame I, a little in the rear of the fender J, and is secured in place adjustably by a wedge-key. To the frame I, a little in the rear of the opener A, is secured the lower part B of the hopper, which projects nearly to the ground, so as to deliver the seed and guano in the furrow opened by the opener A, and prevent them from being blown about by the wind.

The upper part B' of the hopper is hinged to the lower part B, at the rear side, and is secured at the forward side by a hook, $b^1$. The hopper is divided into two compartments by a vertical partition, $b^2$, one of said compartments being intended for cotton-seed, and the other for guano. The bottom of each compartment of the hopper is formed of two bars or narrow plates, C, the ends of which are pivoted to the ends of two short bars, $c'$. The short bars $c'$ are pivoted at their centers to the frame I. D are levers, which are pivoted to the frame I, and to the bars C, so that by operating the lever D the bars C may be moved from and toward each other, to make the discharge-openings larger or smaller, as may be required. The forward bars $c'$ and the levers D may be made in one piece, if desired. K is the stirrer-shaft, which works in notches in the upper edges of the sides of the lower part B of the hopper, and to it, within the compartments of said hopper, are attached radial fingers E. The fingers E in the guano-compartment of the hopper do not extend below the plates C; but the fingers E in the cotton-seed compartment of said hopper are made a little longer, so as to pass through the space between said plates C.

To the opposite sides of the lower part B of the hopper are attached bars L, which project below and to the rearward of said hopper, to loosen up the soil at the sides of the furrow, so that the seed and guano may be more readily covered by the covering-roller.

Upon one end of the stirrer-shaft K is attached, or upon it is formed, a crank, $k'$, to which is pivoted the forward end of a connecting-bar, G. The bar G is also pivoted to a crank, $h'$, formed upon or attached to the journal of the roller H. The rear end of the bar G projects, and passes through a keeper, M, attached to the upright N of the handle F. The connecting-bar G is notched upon its lower side, to receive the pin of the crank $h'$, so that the stirrer may be thrown out of gear when turning around, passing around stumps and other obstructions, and passing from place to place by raising the rear end of the bar G, and placing it in a notch in the upright N.

The forward ends of the handles F are attached to the middle parts of the side bars of the frame I. The handles F are connected by a round, $f'$, and are supported at the proper height by being attached to the upper ends of the uprights N, the lower ends of which are attached to the rear parts of the side bars of the frame I. The journals of the covering-roller H revolve in bearings attached to the side bars of the frame I. To the under side of the rear cross-bar of the frame I is attached a plate, O, to scrape off any soil that may adhere to the face of the roller H.

Having thus described my invention, I claim as new and desire to secure by Letters Patent—

The combination of hopper B B′, stirrer-shaft and fingers F E, parallel bars C, pivoted connecting-bars C′, pivoted levers D, connecting-bar G, opener A, fender J, and coverer H with the frame I, as and for the purpose specified.

JOSEPH ALEXANDER SHINE.

Witnesses:
 GEO. A. NEWELL,
 R. J. SOUTHERLAND.